(No Model.) 2 Sheets—Sheet 1.

J. A. ELLIOTT.
CULTIVATOR AND PLOW.

No. 388,853. Patented Sept. 4, 1888.

Witnesses.
Wm. F. Brereton.
J. B. Johns.

Inventor.
John A. Elliott.
By J. W. Tallmadge
his Atty.

(No Model.) 2 Sheets—Sheet 2.
J. A. ELLIOTT.
CULTIVATOR AND PLOW.
No. 388,853. Patented Sept. 4, 1888.
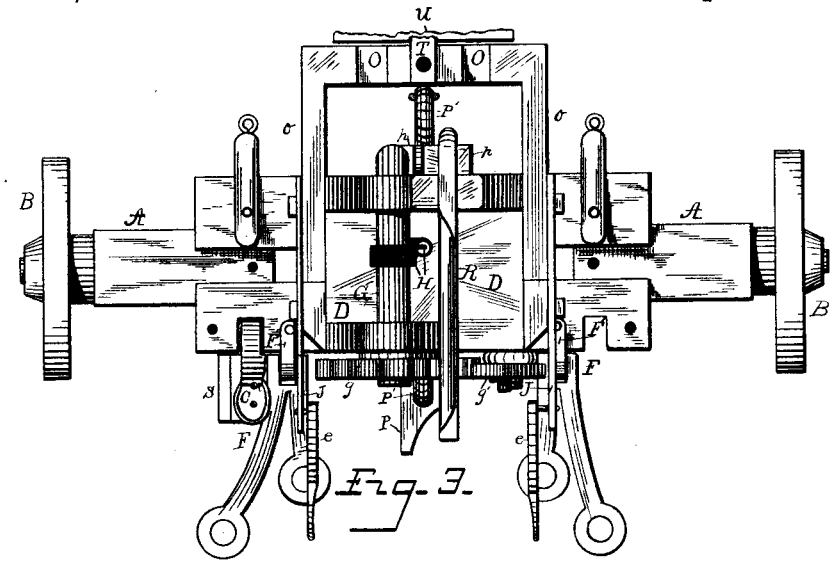
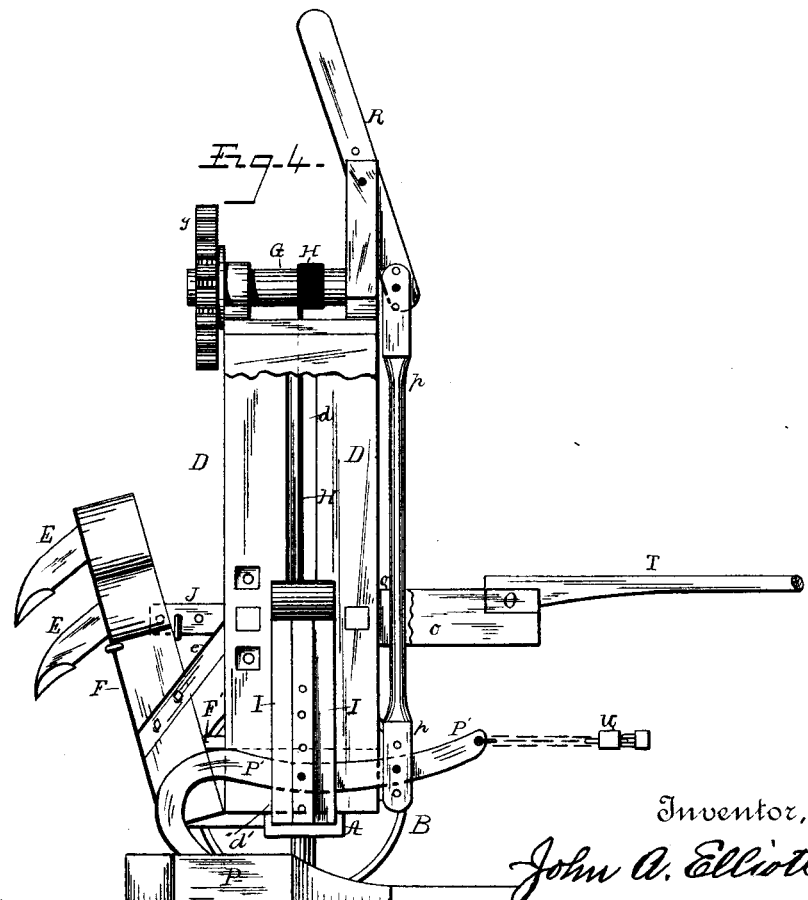
Witnesses.
John Bailey Johns.
Wm H. Brereton.
Inventor,
John A. Elliott,
By his Attorney
T. M. Tallmadge

United States Patent Office.

JOHN A. ELLIOTT, OF NEOSHO RAPIDS, KANSAS, ASSIGNOR OF ONE-HALF TO JOSEPH B. MARTIN, OF SAME PLACE.

CULTIVATOR AND PLOW.

SPECIFICATION forming part of Letters Patent No. 388,853, dated September 4, 1888.

Application filed May 4, 1887. Serial No. 237,025. (No model.)

*To all whom it may concern:*

Be it known that I, JOHN A. ELLIOTT, a citizen of the United States, residing at Neosho Rapids, in the county of Lyon and State of Kansas, have invented certain new and useful Improvements in Combined Cultivators and Plows; and I do hereby declare the following to be a full, clear, and exact description of the invention, such as will enable others skilled in the art to which it appertains to make and use the same.

My invention is an improvement in a combined plow and cultivator; and my said invention consists in certain details of construction whereby the machine may be used as a combined plow and cultivator, or as a cultivator alone, or plow alone; and to this end I proceed as follows, reference being had to the accompanying drawings, in which—

Figure 1:
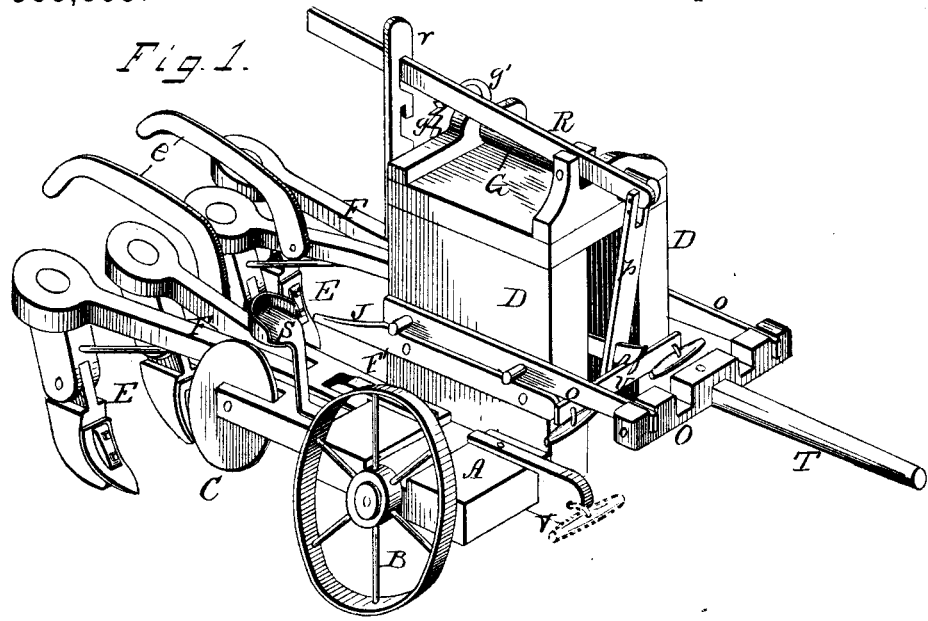
Figure 2:
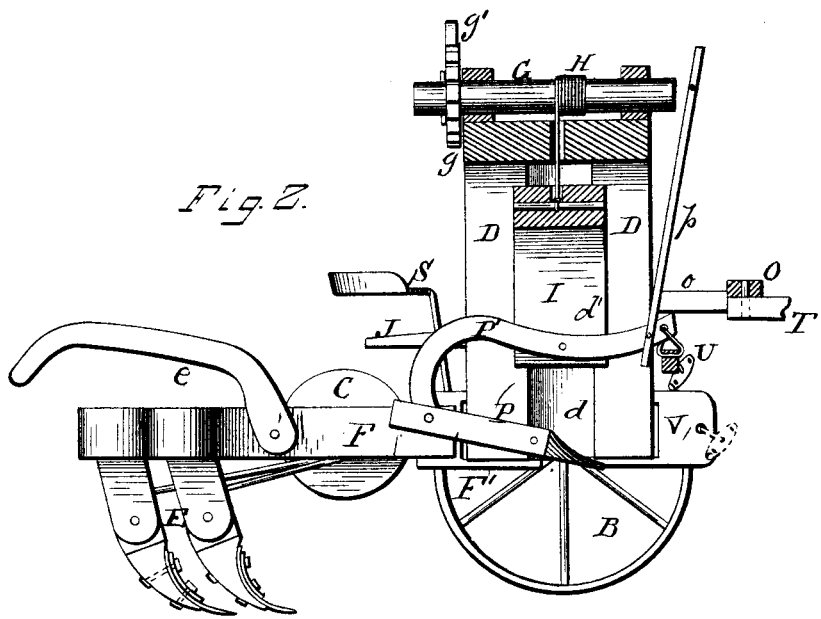

Figure 1 is a view in perspective; Figs. 2 and 4, sectional side elevations, and Fig. 3 a plan view of a combined plow and cultivator constructed according to my invention.

The reference-letters D D designate a suitable frame arranged vertically with lateral extensions A A at its lower end, to which extensions the supporting-wheels B B and cultivator-beams F F are removably attached.

Within the vertical frame D is arranged to slide in grooves *d* in said frame a block, I, having a slotted end, *d'*, within which slot the plow-beam P' of the plow P is pivotally secured. This block I in turn is supported by a rope, H, which passes upward through the top of the frame D, and is secured to a windlass or drum, G, journaled upon said top. At one end of the axle of this windlass is a ratchet-wheel, *g*, which engages a pawl, *g'*, whereby said windlass is held from unwinding. Upon the top of the frame D is also pivoted a hand-lever, R, which lever is connected to the plow-beam P' by a bar, *p*, for the purpose of regulating the elevation of the plow-point for deep or shallow plowing. This hand-lever R, when depressed, engages a rack, *r*, whereby said lever is held in its depressed position.

O *o* is a frame adjustably secured upon the sides of the vertical frame D to support a tongue, T, for attachment of the team; and U is a doubletree attached to the plow-clevis, to which said team is hitched to draw the machine; or, instead of this doubletree U, a singletree, V, may be attached at each side of the frame, as shown in dotted lines in Figs. 1 and 2.

The cultivator-beams F F may, as shown, be bifurcated, and the standards E thereof supplied with any form of cultivator-blades or harrow-teeth desired. Each of these beams F F are supplied with a handle, as at *e*, for the purpose of guiding the same, and at their front ends a bifurcated piece, F', is pivoted, which in turn is pivoted to the extensions A of the frame D, whereby the said cultivators have both a vertical and lateral play.

Secured to the sides and extending rearwardly from the frame D is a support, J, for the cultivators when said cultivators are not in use, as shown in Fig. 4.

S C is a detachable wheel-seat for the driver.

The plow and cultivator may be used together, as shown, but, if desired to use the cultivator alone, as shown in Fig. 2, the plow is elevated by the windlass G and so held by pawl and ratchet *g g'*. If the cultivators be elevated and suspended upon the supports J, as in Fig. 4, the plow may be used alone. When going to and from the field, both the plow and cultivators are to be elevated.

Having thus fully described my invention, what I claim is—

The herein-described combined plow and cultivator, consisting of vertical frame D D, having lateral extensions A A, ground-wheels B B, vertically-adjustable plow P, with means, substantially such as shown, for elevating said plow, cultivator F F, removably pivoted to the side extensions, A, of the frame, and supports J, for suspending said cultivators, all constructed and arranged to operate as and for the purposes set forth.

JOHN A. ELLIOTT.

In presence of—
A. M. FLORY,
WILLIAM L. HUGHES.